(12) United States Patent
Xia et al.

(10) Patent No.: US 9,306,469 B2
(45) Date of Patent: Apr. 5, 2016

(54) RECTIFIER AND ELECTRICAL POWER FACILITY

(71) Applicant: Huawei Technologies Co., Ltd., Shenzhen (CN)

(72) Inventors: Weihong Xia, Shenzhen (CN); Chao Liu, Xi'an (CN); Haiqing Jiao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/587,327

(22) Filed: Dec. 31, 2014

(65) Prior Publication Data

US 2015/0188450 A1 Jul. 2, 2015

Related U.S. Application Data

(63) Continuation of application No. PCT/CN2014/081981, filed on Jul. 10, 2014.

(30) Foreign Application Priority Data

Dec. 31, 2013 (CN) .......................... 2013 1 0750840

(51) Int. Cl.
 *H02M 7/217* (2006.01)
 *H02M 1/32* (2007.01)
(52) U.S. Cl.
 CPC ............... *H02M 7/217* (2013.01); *H02M 1/32* (2013.01)
(58) Field of Classification Search
 CPC .... G01R 31/343; G01R 31/1227; H02H 3/20; H02H 9/00; H02M 7/162
 USPC ............ 363/16, 17, 34–41, 56.01, 56.04, 65, 363/81, 87; 318/42, 48, 78, 508, 700, 706, 318/709; 361/91.1, 68, 52, 170, 93.6, 102
 See application file for complete search history.

(56) References Cited

U.S. PATENT DOCUMENTS

| | | | | |
|---|---|---|---|---|
| 4,525,764 A | * | 6/1985 | Titus ........................ | H02H 3/14 361/42 |
| 4,628,431 A | * | 12/1986 | Kayser ...................... | G06F 1/28 323/901 |

(Continued)

FOREIGN PATENT DOCUMENTS

| | | |
|---|---|---|
| CN | 201134749 Y | 10/2008 |
| CN | 201629687 U | 11/2010 |

(Continued)

OTHER PUBLICATIONS

Partial English Translation and Abstract of Chinese Patent Application No. CN102244507A, May 7, 2015, 3 pages.

(Continued)

*Primary Examiner* — Rajnikant Patel
(74) *Attorney, Agent, or Firm* — Conley Rose, P.C.; Grant Rodolph; Nicholas K. Beaulieu

(57) ABSTRACT

A rectifier and an electrical power facility in which the rectifier is disposed are provided that relate to the field of electromechanical technologies. The rectifier includes a rectifier circuit, a relay, and a controller. The rectifier further includes a detection resistor and a detection circuit, where the detection resistor is connected in series to a winding in the relay, a detection point of the detection circuit is set between the detection resistor and the winding, and an output end of the detection circuit is connected to the controller. When a voltage detected at the detection point of the detection circuit is abnormal, the detection circuit outputs an alarm signal to the controller, and after receiving the alarm signal, the controller stops outputting a driving signal to the driving end of the rectifier circuit.

18 Claims, 3 Drawing Sheets

(56) References Cited

U.S. PATENT DOCUMENTS

| | | | | |
|---|---|---|---|---|
| 5,483,142 | A | * | 1/1996 | Skibinski ............... H02H 9/001 320/166 |
| 8,547,674 | B2 | * | 10/2013 | Zhu ..................... H02H 7/1252 361/91.1 |
| 9,120,644 | B2 | * | 9/2015 | Piech ....................... B66B 1/32 |

FOREIGN PATENT DOCUMENTS

| CN | 102244507 A | 11/2011 |
|---|---|---|
| CN | 202713153 U | 1/2013 |
| CN | 103022965 A | 4/2013 |
| CN | 103337880 A | 10/2013 |
| CN | 203233316 U | 10/2013 |
| CN | 103746570 A | 4/2014 |
| JP | 089647 A | 1/1996 |
| JP | 2009050063 A | 3/2009 |
| JP | 20090296826 A | 12/2009 |
| JP | 2013211950 A | 10/2013 |
| KR | 20130111048 A | 10/2013 |

OTHER PUBLICATIONS

Partial English Translation and Abstract of Chinese Patent Application No. CN202713153U, May 7, 2015, 3 pages.

Partial English Translation and Abstract of Chinese Patent Application No. CN103746570A, Mar. 4, 2015, 2 pages.

Partial English Translation and Abstract of Japanese Patent Application No. JP2009296826A, Mar. 4, 2015, 20 pages.

Partial English Translation and Abstract of Japanese Patent Application No. JPH089647A, Mar. 6, 2015, 52 pages.

Partial English Translation and Abstract of Korean Patent Application No. KR20130111048A, Apr. 28, 2015, 4 pages.

Foreign Communication From a Counterpart Application, PCT Application No. PCT/CN2014/081981, International Search Report dated Sep. 28, 2014, 8 pages.

Foreign Communication From a Counterpart Application, PCT Application No. PCT/CN2014/081981, Written Opinion dated Sep. 28, 2014, 8 pages.

Partial English Translation and Abstract of Chinese Patent Application No. CN203233316, Sep. 17, 2015, 14 pages.

Partial English Translation and Abstract of Japanese Patent Application No. JP2009050063, Sep. 17, 2015, 6 pages.

Partial English Translation and Abstract of Chinese Patent Application No. CN103337880, Part 1, Sep. 17, 2015, 5 pages.

Partial English Translation and Abstract of Chinese Patent Application No. CN103337880, Part 2, Sep. 17, 2015, 4 pages.

Foreign Communication From a Counterpart Application, Chinese Application No. 201310750840.5, Chinese Office Action dated Aug. 10, 2015, 8 pages.

* cited by examiner

RECTIFIER AND ELECTRICAL POWER FACILITY

CROSS-REFERENCE TO RELATED APPLICATIONS

This application is a continuation of International Application No. PCT/CN2014/081981, filed on Jul. 10, 2014, which claims priority to Chinese Patent Application No. 201310750840.5, filed on Dec. 31, 2013, both of which are hereby incorporated by reference in their entireties.

TECHNICAL FIELD

The present invention relates to the field of electromechanical technologies, and in particular, to a rectifier, and an electrical power facility in which the rectifier is disposed.

BACKGROUND

Currently, to ensure that an electrical power facility such as a data center can save and process data in the event of a power failure, an uninterruptible power supply (UPS) is generally used to provide backup power. A conventional UPS supports two-stage power conversion in which an alternating current mains is rectified into a high-voltage direct current to charge a battery, and then a direct current output by the battery is converted into an alternating current to supply power to the electrical power facility. However, as power of a facility continuously increases, power consumption in a two-stage power conversion process also increases. Therefore, currently, in an increasing number of solutions, a later stage, that is, a conversion part of a UPS is eliminated, and a high-voltage direct current is directly used to supply power to an electrical power facility.

Currently, in all electrical power facilities, alternating current rectifiers are used, and relays in the alternating current rectifiers have excellent alternating current breaking capacities, but have relatively poor direct current breaking capacities. Under a condition of direct current input, an arc flash may be caused when a current-carrying relay is disconnected. Therefore, under a condition of direct current input, when a relay is faulty, the relay is disconnected when carrying a current, which causes an arc fire to the relay, thereby resulting in a problem of poor security.

SUMMARY

Embodiments of the present invention provide a rectifier, and an electrical power facility in which the rectifier is disposed, so that a problem of poor security of an existing rectifier is solved.

To achieve the foregoing objective, the following technical solutions are used in the embodiments of the present invention.

According to a first aspect, a rectifier is provided and includes a rectifier circuit, a relay, and a controller, where the relay is disposed at a power input end of the rectifier circuit, and the controller is connected to a control end of the relay and a driving end of the rectifier circuit; when the controller outputs a turn-on signal to the relay, a winding in the relay is powered on, so that the power input end of the rectifier circuit is connected to an external power source, and the controller outputs a driving signal to the driving end of the rectifier circuit, so that the rectifier circuit rectifies electrical energy output by the external power source; the rectifier further includes a detection resistor and a detection circuit, where the detection resistor is connected in series to the winding in the relay, a detection point of the detection circuit is set between the detection resistor and the winding, and an output end of the detection circuit is connected to the controller; when a voltage detected at the detection point of the detection circuit is abnormal, the detection circuit outputs an alarm signal to the controller, and after receiving the alarm signal, the controller stops outputting a driving signal to the driving end of the rectifier circuit.

In a first possible implementation manner, the rectifier further includes a direct current power source and a first triode, where one end of the winding of the relay is connected to the direct current power source, and the other end of the winding is connected to a collector of the first triode; and an emitter of the first triode is grounded, and as the control end of the relay, a base of the first triode is connected to the controller.

With reference to the first possible implementation manner, in a second possible implementation manner, the detection resistor is connected in series between the winding and the collector of the first triode.

With reference to the first possible implementation manner, in a third possible implementation manner, the detection resistor is connected in series between the winding and the direct current power source.

With reference to any one of the foregoing possible implementation manners, in a fourth possible implementation manner, the detection circuit is a window comparator circuit.

With reference to the fourth possible implementation manner, in a fifth possible implementation manner, the window comparator circuit includes a first comparator and a second comparator; the detection point is connected to an inverting input end of the first comparator and a non-inverting input end of the second comparator, a reference high-voltage is input to a non-inverting input end of the first comparator, and a reference low-voltage is input to an inverting input end of the second comparator; and an output end of the first comparator and an output end of the second comparator are connected to serve as an output end of the window comparator circuit, and the output end of the window comparator circuit is connected to the controller.

With reference to the fifth possible implementation manner, in a sixth possible implementation manner, the window comparator circuit further includes a voltage conversion circuit, and the output ends of the first comparator and the second comparator are connected to the controller via the voltage conversion circuit; the voltage conversion circuit includes a transistor and a second triode; a gate of the transistor is connected to the output ends of the first comparator and the second comparator, a drain of the transistor is connected to a base of the second triode, and a source of the transistor is grounded; and the base and a collector of the second triode are connected to a 3.3 volt (V) power source, an emitter of the second triode is grounded, and as the output end of the window comparator circuit, the collector of the second triode is connected to the controller.

With reference to any one of the foregoing possible implementation manners, in a seventh possible implementation manner, the rectifier further includes a soft-start resistor that is connected in parallel to the relay.

With reference to any one of the foregoing possible implementation manners, in an eighth possible implementation manner, the rectifier further includes a diode that is connected in parallel to the winding of the relay.

According to a second aspect, an electrical power facility is provided and includes a power source and the foregoing rectifiers, where the power source is connected to an input end of the rectifier, and an output end of the rectifier supplies power to the electrical power facility.

Compared with the prior art, the foregoing technical solutions provided in the present invention have the following advantages. A detection resistor and a detection circuit are added in the rectifier provided in the present invention; the detection resistor is connected in series to a winding of a relay; and a detection point of the detection circuit is set between the detection resistor and the winding. When a voltage at the detection point is abnormal, the detection circuit outputs an alarm signal to a controller, and after receiving the alarm signal, the controller can immediately stop outputting a driving signal to a driving end of a rectifier circuit. After a fault occurs on the relay, the relay is disconnected after a delay. By contrast, a speed at which the detection circuit sends an alarm signal and the controller stops outputting a driving signal is faster. In this way, the controller can stop outputting a driving signal before the relay is disconnected, thereby ensuring that the relay is disconnected when carrying no current, avoiding an arc fire on the relay, and improving security of the rectifier.

BRIEF DESCRIPTION OF THE DRAWINGS

To describe the technical solutions in the embodiments of the present invention more clearly, the following briefly introduces the accompanying drawings required for describing the embodiments.

DETAILED DESCRIPTION

The following clearly describes the technical solutions in the embodiments of the present invention with reference to the accompanying drawings in the embodiments of the present invention.

Embodiment 1

Figure 1:
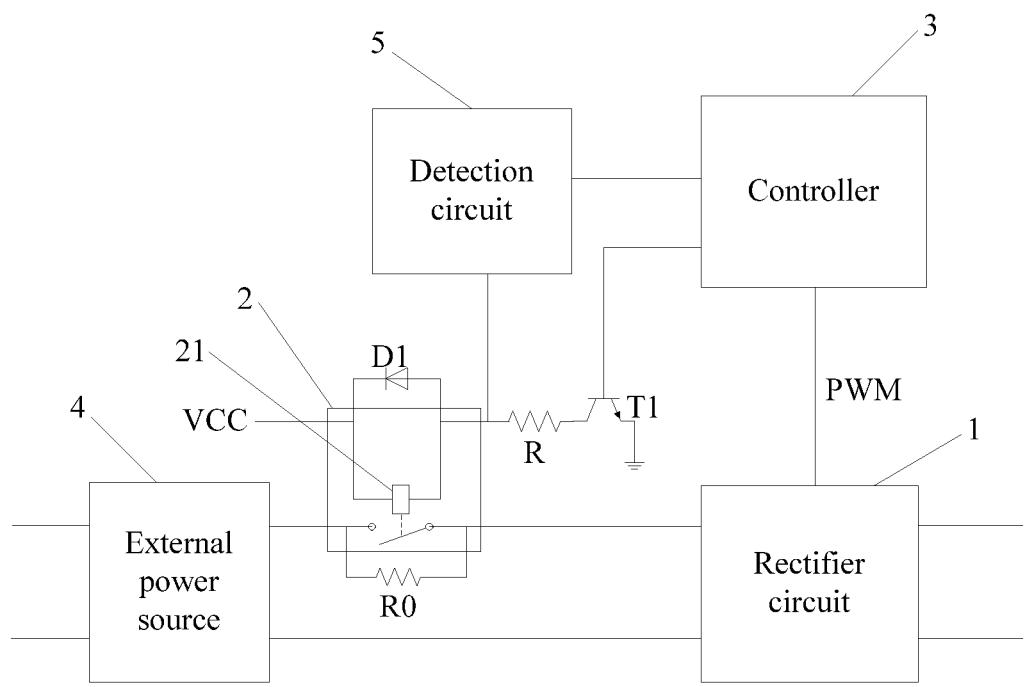
FIG. 1 is a schematic diagram of a rectifier according to Embodiment 1 of the present invention.

As shown in FIG. 1, a rectifier provided in this embodiment of the present invention includes a rectifier circuit 1, a relay 2, a controller 3, where the relay 2 is disposed at a power input end of the rectifier circuit 1, and the controller 3 is connected to a control end of the relay 2 and a driving end of the rectifier circuit 1.

When the controller 3 outputs a turn-on signal to the relay 2, a winding 21 in the relay 2 is powered on, so that the power input end of the rectifier circuit 1 is connected to an external power source 4, and the controller 3 outputs a driving signal to the driving end of the rectifier circuit 1, so that the rectifier circuit 1 rectifies electrical energy output by the external power source 4.

The rectifier further includes a detection resistor R and a detection circuit 5. The detection resistor R is connected in series to the winding 21 in the relay 2. A detection point of the detection circuit 5 is set between the detection resistor R and the winding 21. An output end of the detection circuit 5 is connected to the controller 3.

When a voltage detected at the detection point of the detection circuit 5 is abnormal, the detection circuit 5 outputs an alarm signal to the controller 3, and after receiving the alarm signal, the controller 3 stops outputting a driving signal to the driving end of the rectifier circuit 1.

The rectifier provided in this embodiment of the present invention may be applied in alternating current input, and may also be applied in direct current input. In this embodiment of the present invention, the detection resistor R and the detection circuit 5 are added in the rectifier the detection resistor R is connected in series to the winding 21 of the relay 2, and the detection point of the detection circuit 5 is set between the detection resistor R and the winding 21. When a voltage at the detection point is abnormal, the detection circuit 5 outputs an alarm signal to the controller 3, and after receiving the alarm signal, the controller 3 can immediately stop outputting a driving signal to the driving end of the rectifier circuit 1. For example, the controller blocks pulse width modulation (PWM). After a fault occurs on the relay 2, the relay 2 is disconnected after a delay (about several milliseconds). By contrast, a speed at which the detection circuit 5 sends an alarm signal and the controller 3 stops outputting a driving signal is faster (about 200 microseconds). In this way, the controller 3 can stop outputting a driving signal before the relay 2 is disconnected, thereby ensuring that the relay 2 is disconnected when carrying no current, avoiding an arc fire on the relay 2, and improving security of the rectifier.

Further, the rectifier provided in this embodiment of the present invention further includes a direct current power source VCC and a first triode T1. One end of the winding 21 of the relay 2 is connected to the VCC, and the other end of the winding 21 is connected to a collector of T1. An emitter of T1 is grounded, and as the control end of the relay 2, a base of T1 is connected to the controller 3.

In this embodiment, a soft-start resistor R0 that is connected in parallel to the relay 2 and a diode D1 that is connected in parallel to the winding 21 of the relay 2 are further included. When the controller 3 sends a control signal to the base of T1, T1 is turned on, so that the winding 21 is powered on to form a closed circuit of the relay. Before the relay 2 is closed, the external power source 4 first charges a capacitor (which is not shown in the figure) on a load side by using R0, so as to avoid that the relay 2 generates a relatively large current when the relay 2 is closed. After the relay 2 is closed, the external power source 4 is connected to the rectifier, and the external power source 4 can supply power to an electrical power facility by using the rectifier. When the closed circuit of the relay 2 is opened, D1 and the winding 21 may form a discharge circuit to release electrical energy stored in the winding 21.

In this embodiment, the detection resistor R is connected in series between the winding 21 and the collector of T1. A resistance value of the detection resistor R is 47 ohms ($\Omega$), a voltage of the VCC is generally 12V, and a resistance value of the winding 21 is generally 360$\Omega$. Therefore, a normal voltage at the detection point should be about 1.6V. When a fault occurs on the relay 2, a voltage at the detection point becomes abnormal. There may be different abnormal voltages at the detection point according to different fault causes, as shown in Table 1. When detecting that the voltage at the detection point is excessively high or excessively low, the detection circuit 5 sends an alarm signal to the controller 3, and the controller 3 stops outputting a driving signal, thereby ensuring that the relay 2 is disconnected when carrying no current, and avoiding an arc fire on the relay.

TABLE 1

| Fault cause | Voltage at detection point |
| --- | --- |
| A winding of a relay is short-circuited | 12 V |
| A winding of a relay is open-circuited | 0 V |
| A winding of a relay fails | 12 V or 0 V |
| A direct current power source is disconnected | 0 V |

Figure 2:
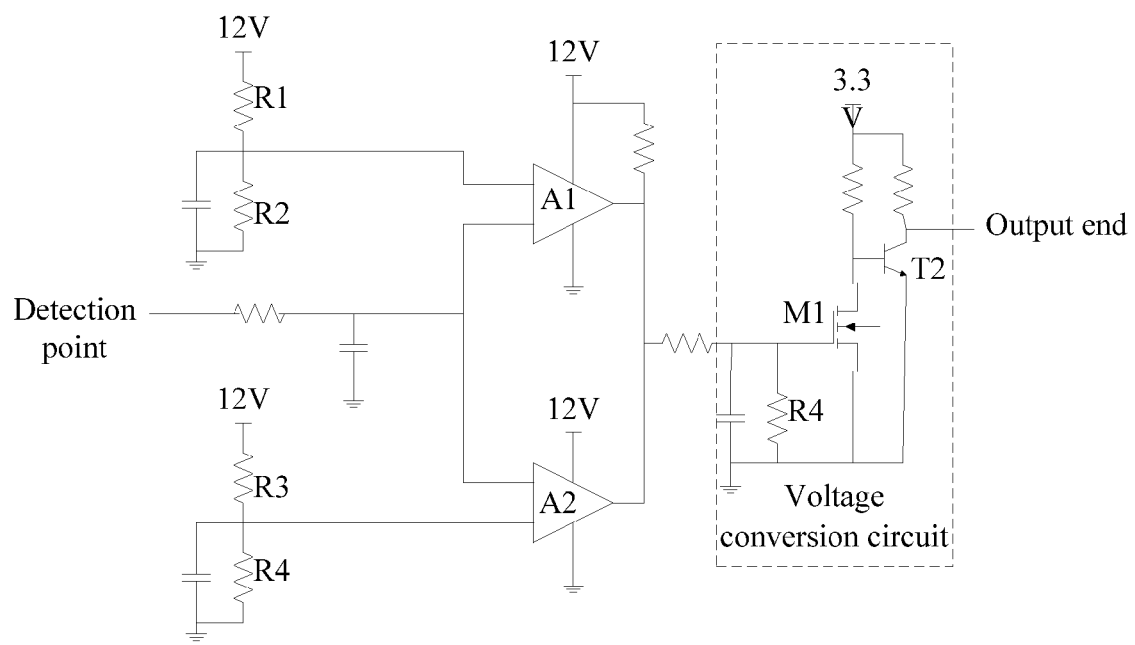
FIG. 2 is a schematic diagram of a window comparator circuit in the rectifier according to Embodiment 1 of the present invention.

As an exemplary solution, the detection circuit 5 is a window comparator circuit. As shown in FIG. 2, in this embodiment, the window comparator circuit includes a first comparator A1 and a second comparator A2. The detection point is connected to an inverting input end of A1 and a non-inverting input end of A2. A reference high-voltage is input to a non-inverting input end of A1, where the reference high-voltage is set to 8V. A reference low-voltage is input to an inverting input end of A2, where the reference low-voltage is set 0.8V. That is, a voltage, which is higher than 8V or lower than 0.8V, at the detection point is considered as an abnormal voltage. The reference high-voltage and the reference low-voltage are respectively obtained in a manner of dividing a voltage by connecting resistors R1 and R2 in series and in a manner of dividing a voltage by connecting resistors R3 and R4 in series. An output end of A1 and an output end of A2 are connected to serve as an output end of the window comparator circuit, and the output end of the window comparator circuit is connected to the controller 3.

In a normal case, a voltage at the detection point is 1.6V, and the output ends of A1 and A2 both output high electrical level signals, that is, normal signals. When the voltage at the detection point is higher than 8V, A1 outputs a low electrical level signal, that is, an alarm signal; or when the voltage at the detection point is lower than 0.8V, A2 outputs a low electrical level signal, that is, an alarm signal. Because the output end of A1 and the output end of A2 are connected, a low electrical level signal output by one of the comparators lowers a high electrical level signal output by the other comparator. Then the output end of the window comparator circuit outputs a low electrical level signal, that is, an alarm signal.

Further, the window comparator circuit includes a voltage conversion circuit. The output ends of A1 and A2 are connected to the controller 3 via the voltage conversion circuit. The voltage conversion circuit includes a transistor M1 and a second triode T2. A gate of M1 is connected to the output ends of A1 and A2, a drain of M1 is connected to a base of T2, and a source of M1 is grounded. The base and a collector of T2 are connected to a 3.3V power source and voltages at the base and the collector are pulled up to a high electrical level by the 3.3V power source; an emitter of T2 is grounded, and as the output end of the window comparator circuit, the collector of T2 is connected to the controller.

In a normal case, the output ends of A1 and A2 output high electrical level signals, M1 is turned on, and a voltage at the base of T2 is lowered, so that T2 is not turned on. In this case, the voltage at the collector of T2 is on a high electrical level, and the output end of the window comparator circuit (the collector of T2) outputs a high electrical level signal, that is, a normal signal. When the voltage at the detection point is abnormal, the output end of A1 or A2 outputs a low electrical level signal, and M1 is not turned on, so that T2 is turned on. In this case, the voltage at the collector of T2 is lowered, and the output end of the window comparator circuit outputs a low electrical level signal, that is, an alarm signal.

By disposing the voltage conversion circuit, a 12V electrical level signal output by A1 or A2 is converted to a 3.3V electrical level signal, and then output to the controller 3. The controller 3 is generally a digital signal processor (DSP), a single-chip microcomputer, or the like. Therefore, the 3.3V high electrical level signal serves as an alarm signal, which is more convenient for the controller to receive the alarm signal, so as to improve feasibility of the rectifier provided in this embodiment of the present invention.

Embodiment 2

Figure 3:
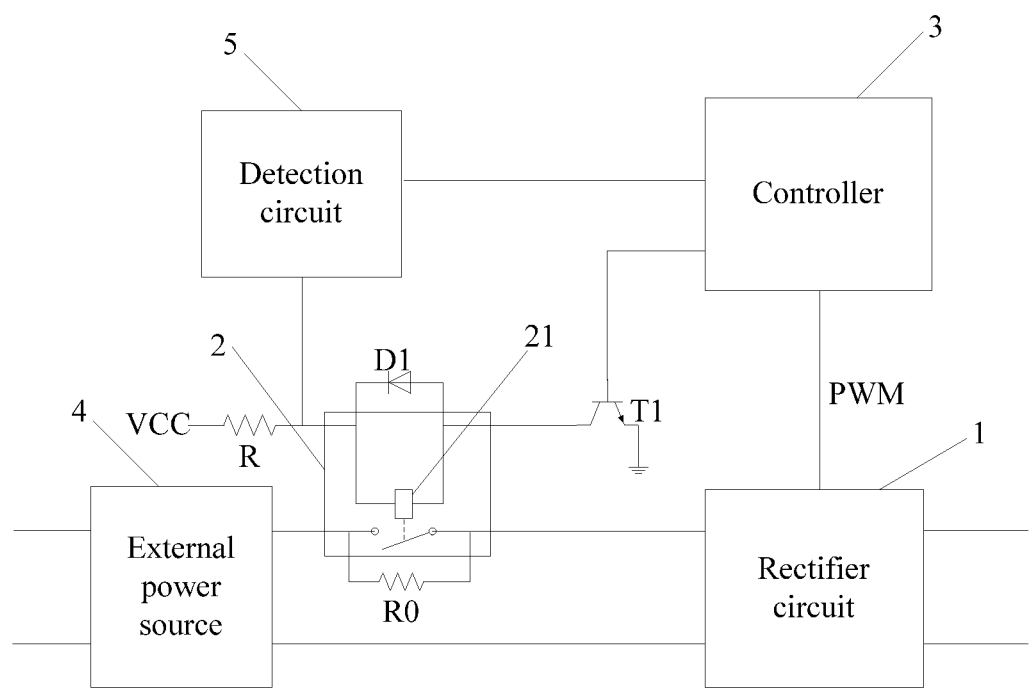
FIG. 3 is a schematic diagram of a rectifier according to Embodiment 2 of the present invention.

This embodiment is basically the same as Embodiment 1, and a difference lies in that, as shown in FIG. 3, in this embodiment, a detection resistor R is connected in series between a winding 21 and a VCC, and a normal voltage at a detection point that is located between the detection resistor R and the winding 21 is about 10.4V. Table 2 describes abnormal voltages, caused by different faults, at the detection point.

TABLE 2

| Fault cause | Voltage at detection point |
| --- | --- |
| A winding of a relay is short-circuited | 0 V |
| A winding of a relay is open-circuited | 12 V |
| A winding of a relay fails | 12 V or 0 V |
| A direct current power source is disconnected | 0 V |

Compared with Embodiment 1, this embodiment varies only in a location of the detection resistor R, and in that, for a same fault cause, a voltage at the detection point is different; and its operating principle and operating process are the same as those in Embodiment 1. Therefore, a same technical effect as that in Embodiment 1 can also be achieved and a same technical problem can also be solved.

Embodiment 3

This embodiment of the present invention provides an electrical power facility, where the electrical power facility includes a power source and the rectifier provided in Embodiment 1 or Embodiment 2. The power source may be a UPS or another direct current power source or alternating current power source. The power source is connected to an input end of the rectifier, and an output end of the rectifier supplies power to the electrical power facility, that is, the power source supplies power to the electrical power facility by using the rectifier.

The electrical power facility provided in this embodiment of the present invention has a same technical feature as the rectifier provided in the foregoing embodiment. Therefore, a same technical effect can also be produced and a same technical problem can also be solved.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A rectifier, comprising:
a rectifier circuit;
a relay; and
a controller, wherein the relay is disposed at a power input end of the rectifier circuit, and the controller is connected to a control end of the relay and a driving end of the rectifier circuit, wherein a winding in the relay is powered on when the controller outputs a turn-on signal to the relay such that the power input end of the rectifier circuit is connected to an external power source, and the controller outputs a driving signal to the driving end of the rectifier circuit such that the rectifier circuit rectifies electrical energy output by the external power source, wherein the rectifier further comprises a detection resistor and a detection circuit, wherein the detection resistor is connected in series to the winding in the relay, a detection point of the detection circuit is set between the detection resistor and the winding, and an output end of the detection circuit is connected to the controller, and wherein the detection circuit outputs an alarm signal to the controller when a voltage detected at the detection point of the detection circuit is abnormal, and after receiving the alarm signal, the controller stops outputting a driving signal to the driving end of the rectifier circuit.

2. The rectifier according to claim 1, further comprising a direct current power source and a first triode, wherein one end of the winding of the relay is connected to the direct current power source, and the other end of the winding is connected to a collector of the first triode, and wherein an emitter of the first triode is grounded, and as the control end of the relay, a base of the first triode is connected to the controller.

3. The rectifier according to claim 2, wherein the detection resistor is connected in series between the winding and the collector of the first triode.

4. The rectifier according to claim 2, wherein the detection resistor is connected in series between the winding and the direct current power source.

5. The rectifier according to claim 1, wherein the detection circuit is a window comparator circuit.

6. The rectifier according to claim 5, wherein the window comparator circuit comprises a first comparator and a second comparator, wherein the detection point is connected to an inverting input end of the first comparator and a non-inverting input end of the second comparator, a reference high-voltage is input to a non-inverting input end of the first comparator, and a reference low-voltage is input to an inverting input end of the second comparator, and wherein an output end of the first comparator and an output end of the second comparator are connected to serve as an output end of the window comparator circuit, and the output end of the window comparator circuit is connected to the controller.

7. The rectifier according to claim 6, wherein the window comparator circuit further comprises a voltage conversion circuit, and the output ends of the first comparator and the second comparator are connected to the controller via the voltage conversion circuit, wherein the voltage conversion circuit comprises a transistor and a second triode, wherein a gate of the transistor is connected to the output ends of the first comparator and the second comparator, a drain of the transistor is connected to a base of the second triode, and a source of the transistor is grounded, and wherein the base and a collector of the second triode are connected to a 3.3 volt (V) power source, an emitter of the second triode is grounded, and as the output end of the window comparator circuit, the collector of the second triode is connected to the controller.

8. The rectifier according to claim 1, further comprising a soft-start resistor that is connected in parallel to the relay.

9. The rectifier according to claim 1, further comprising a diode that is connected in parallel to the winding of the relay.

10. An electrical power facility, comprising:
a power source; and
a rectifier,
wherein the power source is connected to an input end of the rectifier, and an output end of the rectifier supplies power to the electrical power facility,
wherein the rectifier comprises a rectifier circuit, a relay, and a controller,
wherein the relay is disposed at a power input end of the rectifier circuit, and the controller is connected to a control end of the relay and a driving end of the rectifier circuit,
wherein a winding in the relay is powered on when the controller outputs a turn-on signal to the relay such that the power input end of the rectifier circuit is connected to an external power source, and the controller outputs a driving signal to the driving end of the rectifier circuit such that the rectifier circuit rectifies electrical energy output by the external power source,
wherein the rectifier further comprises a detection resistor and a detection circuit,
wherein the detection resistor is connected in series to the winding in the relay, a detection point of the detection circuit is set between the detection resistor and the winding, and an output end of the detection circuit is connected to the controller,
wherein the detection circuit outputs an alarm signal to the controller when a voltage detected at the detection point of the detection circuit is abnormal, and after receiving the alarm signal, the controller stops outputting a driving signal to the driving end of the rectifier circuit.

11. The electrical power facility according to claim 10, further comprising a direct current power source and a first triode, wherein one end of the winding of the relay is connected to the direct current power source, and the other end of the winding is connected to a collector of the first triode, and wherein an emitter of the first triode is grounded, and as the control end of the relay, a base of the first triode is connected to the controller.

12. The electrical power facility according to claim 11, wherein the detection resistor is connected in series between the winding and the collector of the first triode.

13. The electrical power facility according to claim 11, wherein the detection resistor is connected in series between the winding and the direct current power source.

14. The electrical power facility according to claim 10, wherein the detection circuit is a window comparator circuit.

15. The electrical power facility according to claim 14, wherein the window comparator circuit comprises a first comparator and a second comparator, wherein the detection point is connected to an inverting input end of the first comparator and a non-inverting input end of the second comparator, a reference high-voltage is input to a non-inverting input end of the first comparator, and a reference low-voltage is input to an inverting input end of the second comparator, and wherein an output end of the first comparator and an output end of the second comparator are connected to serve as an output end of the window comparator circuit, and the output end of the window comparator circuit is connected to the controller.

16. The electrical power facility according to claim 15, wherein the window comparator circuit further comprises a voltage conversion circuit, and the output ends of the first comparator and the second comparator are connected to the controller via the voltage conversion circuit, wherein the voltage conversion circuit comprises a transistor and a second triode, wherein a gate of the transistor is connected to the output ends of the first comparator and the second comparator, a drain of the transistor is connected to a base of the second triode, and a source of the transistor is grounded, and wherein the base and a collector of the second triode are connected to a 3.3 volt (V) power source, an emitter of the second triode is grounded, and as the output end of the window comparator circuit, the collector of the second triode is connected to the controller.

17. The electrical power facility according to claim 10, further comprising a soft-start resistor that is connected in parallel to the relay.

18. The electrical power facility according to claim 10, further comprising a diode that is connected in parallel to the winding of the relay.

\* \* \* \* \*